Feb. 16, 1943.　　　S. C. CARNEY　　　2,311,154
PROCESS FOR AGGLOMERATING COMMERCIAL CARBON BLACK
Filed Feb. 28, 1939　　　4 Sheets-Sheet 3

INVENTOR
S.C. CARNEY
BY
ATTORNEYS

Feb. 16, 1943.  S. C. CARNEY  2,311,154
PROCESS FOR AGGLOMERATING COMMERCIAL CARBON BLACK
Filed Feb. 28, 1939  4 Sheets-Sheet 4

INVENTOR
S.C. CARNEY
BY
ATTORNEYS

UNITED STATES PATENT OFFICE 2,311,154

PROCESS FOR AGGLOMERATING COMMERCIAL CARBON BLACK

Samuel C. Carney, Bartlesville, Okla., assignor to Phillips Petroleum Company, a corporation of Delaware Application February 28, 1939, Serial No. 259,065

10 Claims. (Cl. 23—314)

This invention relates to the art of transforming the dusty light carbon as produced, into free flowing, relatively dustless, small aggregates with density of 20 pounds or more per cubic foot as against the 3 pounds per cubic foot of the original material.

The object is to increase density and improve flow characteristics, to cheapen and facilitate storage and handling of the material, and largely to eliminate its dusting character without interference with the step in rubber compounding of thorough dispersion of the carbon black in the rubber batch.

The known art includes both "wet" and "dry" processes. In the wet processes, the black is wetted by one or more liquids, which in commercial practice, is really confined to the use of water. Water so used is for the purpose of promoting the agglomeration and it is always removed later by known drying processes.

It is an advantage of this and other "dry" processes over the wet ones that the two separate operations of adding and removing the water are eliminated, together with the change in characteristics of the black due to wetting and subsequent drying at a temperature somewhat elevated. Also, the wet black is quite corrosive to equipment metals, even to stainless steel, which is used in the wet processes, and the dry black is very slightly, if at all, corrosive to ordinary steel which is used in the dry processes.

Cabot and Huber practice the dry processes known to the art which processes are shown in Patents 2,120,540; 2,120,541; 2,102,054; 2,127,137 and Re. 19,750. The advantage of the present invention over these lies in cheaper equipment, less power for its operation, more positive and certain control of the operation and, at least in comparison with Huber, a finished product more nearly dustless and of greater density. As compared with the Cabot's, the present invention has the advantage of a continuous process over a batch, Cabot's being batch. Huber's though, is also continuous but as compared to them both, neither of theirs will operate to produce a commercial product on carbon black as produced at the plant, but both require a preliminary treatment to increase the mass density of the unagglomerated raw material, whereas the present process operates preferably on the black as produced, thus eliminating the step of preliminary densification common to both the former processes. A further advantage over both these is that, in the language of the art, both their processes are "self-seeding." This means that they both so operate their mechanism for agglomeration that a part of the product is broken down into smaller particles which serve as nuclei on which raw material is deposited. The present process can be operated in a self-seeding manner but only at the cost of reduced throughput. The process on the contrary, maintains in the apparatus for agglomeration, less severe mechanical conditions than in the known art so that breaking of aggregates by attrition is so minimized that it is not "self-seeding," and in a separate apparatus, subject a mixture of large and small aggregates to a condition such that attrition exceeds agglomeration thus making independently a supply of nuclei or "seed" which is continuously introduced with the feed to the apparatus for agglomeration.

It has long been known that many powdered solids have the inherent quality of agglomeration. This has been known specifically of carbon black for many years following observation of the phenomenon as naturally occurring in rotary cylindrical sieves and in stirring devices used for increasing density of bulk black by stirring out occluded air and gases. Of the two commercial dry processes, that of Cabot may be considered as an intentional development of the older stirring processes. Cabot uses "turbulent agitation" in a "multidirectional" manner to bring about a progressive change in the original amorphous black, gradually increasing its density until it has the "viscosity" described when it is built up by its addition in "consecutive, concentric, spherical shells" to the smaller aggregates from previous batches. The Huber process may likewise be considered as a development from the observation that relatively spherical agglomerates are formed in rotary cylindrical sieves. In contrast to the vigorous turbulent mechanical stirring in the horizontal plane of Cabot's process, at speeds around 45 R. P. M., Huber uses a much gentler and slower rolling in rotating cylinders, where there exists flow rather than turbulence. The Huber motion is assisted by relatively gentle compacting by a roller, the effect being, like Cabot, to produce a progressive compacting of the highly dispersed raw material until it finally coheres in the finished agglomerates of commerce.

In the wet processes, the black after wetting with water, is really plastic material and is treated as such. But Cabot and Huber also treat the amorphous dry black as a plastic material, working it by their respective methods until it reaches a coherent state. This basic similarity in the processes of the prior art, both wet and dry, is well illustrated if we consider the fact that in all of them the weight of carbon black existing inside their apparatus at any given moment of time consists predominantly of black which is in a state of change from low to high density, from a dispersed to an organized arrangement and also in the wet processes in a state of progression from wet to dry.

In the present process alone, this condition does not exist. Within the entire apparatus at any given time, around 90% of the entire carbon black content is in the high density, organized, agglomerated state. Furthermore the average size and weight of the agglomerated particles which are contained within the apparatus at any given time is substantially the same as that of the final product. For, although there is present a small proportion smaller than the finished product, there is also present a compensating proportion that is larger than the finished product.

The reason for this is that it has been discovered that dry carbon black is not a plastic material but has definite cleavage planes like those other forms of carbon, coal and the diamond. It has further been discovered that its agglomerates are built up by its adhesion to itself in a manner rather similar to gold. As a dentist builds up a gold filling by merely pounding small increments of gold on a larger aggregate, so the present carbon aggregates are built up by the addition of an almost infinite number of small increments of the unorganized amorphous black.

By microscopic observation of repeated experiments, two properties of carbon black agglomerates have been found which are thought to be unknown to the prior art. First, the amorphous low density black as produced, with its normal content of occluded air and gases, acts in a manner similar to a lubricant as does talcum powder, soapstone, or graphite, in other operations involving friction, if uniformly distributed through a mass of the agglomerates. If the same agglomerates be given the same mechanical movement in the absence of a supply of the light amorphous material, so strong is their surface adhesion to each other that they will begin to tear off small particles from each other roughening their surfaces. The second observation made is that such small aggregates, having angular shape and bounded by more or less plane surfaces, will in large numbers re-adhere to larger aggregates having two or three times their diameter. That is to say, if one subject to mechanical free movement a mixture of, for example, 28 mesh aggregates with others of size 100 mesh and smaller, and in the absence of any amorphous material, the larger ones will break each other down in size and at the same time the smaller ones will adhere to them, thus making an assortment of sizes between maximum and minimum and reducing the percentage of those of minimum size.

Both of these discoveries are made use of in the present process. The first is used by supplying amorphous feed throughout nearly the entire length of my granulator thus preserving in the product a smooth surface, free from angular projections, thus making it more nearly dustless and of superior flow characteristics. The second is used in the "seed mill" where it may be considered a use of the old principle of survival of the fittest. Where the other dry processes use as "seed," exclusively those particles sifted from the product as being too small for inclusion therein, and return this to the agglomerating apparatus without further treatment, this process uses seed of much larger average size, formed by the interaction of particles larger than the product on those smaller than the product and sifted to a maximum size nearly, if not fully, as large as the maximum product size. The product thus used as seed comprises material of higher density than theirs because it has been subjected in the seed mill, to a period of impacts with large particles without cushioning by the presence of an excess of amorphous material and that part of the seed which is of small size has, by reason of its shape and the quality of its surface, escaped re-agglomeration on larger particles and is thus by natural selection suited to act as nuclei for further growth.

This basic advantage of the present process in having present in the apparatus a working charge consisting entirely of high density aggregated material in an assortment of sizes ranging from smaller, and through the entire range of sizes to one larger than the maximum product size, is so radically different from the prior art that it requires a more detailed explanation. Most persons, probably, on first hearing of it, consider it a disadvantage rather than an advantage. It is, in fact, much more the conventional practice in all manufacturing to do instead as does the prior art. When one transforms any raw material from its original unorganized form into a more concentrated or more organized form, it is the almost universal practice to perform upon it in sequence a series of operations as it passes through the apparatus, so that the material reaches its final desired form and simultaneously leaves the apparatus. Thus Cabot and Huber start with black as produced, increase its density by driving off gases by some form of stirring, next add to it either in batch or continuously, a proportion of previously made "seed" of about 60 mesh and smaller and by continuing the mass in some form of mechanical motion, cause the seed to grow by accretion until 50% or more of it reaches the desired size.

The effective mechanism of my process is the consolidated granules themselves, and their mere presence is not enough. They must be in active motion, at least largely rotary, and this motion is most readily attained with larger granules, which are not surrounded by a mass of either fine agglomerates or by the extremely fine raw material. A particle of twice the diameter of another has eight times the volume, a particle of 28 mesh has 4 times the diameter of one of 100 mesh, and it has 64 times the volume, but a pound of 28 mesh particles has only ¼ the surface of a pound of 100 mesh particles.

Because of these relations, almost the exact reverse of the prior art procedures has been used. Where the prior art adds small seed to amorphous material in process, the present process maintains an extremely high concentration of the very active, free flowing, agglomerated material having the physical properties and substantially the average size of the desired product, and to this, while moving with perfect freedom actuated only by gravity, is added the amorphous raw feed uniformly in such small increments that it is almost immediately caught and held on the large moving solid surface of high density granules presented in the present apparatus. To a large amount of the active high density material is added a small amount of the inactive low density feed, while the prior art adds to a large amount of inactive feed a limited amount of seed, less active than that material used in the present process because it is smaller in size.

The objection often made to the present procedure is the one that the prior art obviously has feared. That is, if one add feed to moving granules already of nearly or quite maximum product size, they will grow too large and either break down spontaneously or have to be sifted out and reprocessed. That is, in fact, true of the self-seeding processes, and they are troubled with an occasional general disintegration of the material in process which makes a formless mass of "viscous or sticky" densed but not organized material.

This brings us to another advantage of the process, namely its inherent control, without adjustment by the operator, of the amount of separately produced "seed," fed continuously into the "granulator." As has been shown, one pound of 28 mesh has ¼ the surface of a pound of 100 mesh and in general a pound of a given diameter N has 1/N as much surface as a pound of diameter 1. On the other hand, to a pound of 100 mesh seed must ideally be added 63 pounds of amorphous feed to make 64 pounds of 28 mesh containing an equal number of particles. So the mathematical law of growth favors the small and medium sizes over the larger.

The amount of seed made in the seed mill is governed by the amount of over size fed to it after being sifted from the product. If the "seed" supply to the granulator be reduced, there will be less competition from the surface of small sizes for the supply of amorphous feed and the percentage of oversize in the product will increase. Since all oversize goes to the seed mill to be broken down, this will increase the amount of seed. An increase in the mount of seed sent to the granulator will, on the contrary, reduce the amount of oversize made there. Since this oversize is material from which seed is made in the "seed mill," the amounts of seed, and of oversize in the product are thus in a state of inherent balance, each being both a cause and an effect of the other and they will therefore control each other at a steady state, determined by the mesh size of sieves fitted by the operator and the severity of the attrition in the "seed mill" also determined by him.

In the accompanying drawings, forming a part of this specification, and in which like numerals are employed to designate like parts throughout the same:

Figure 1:
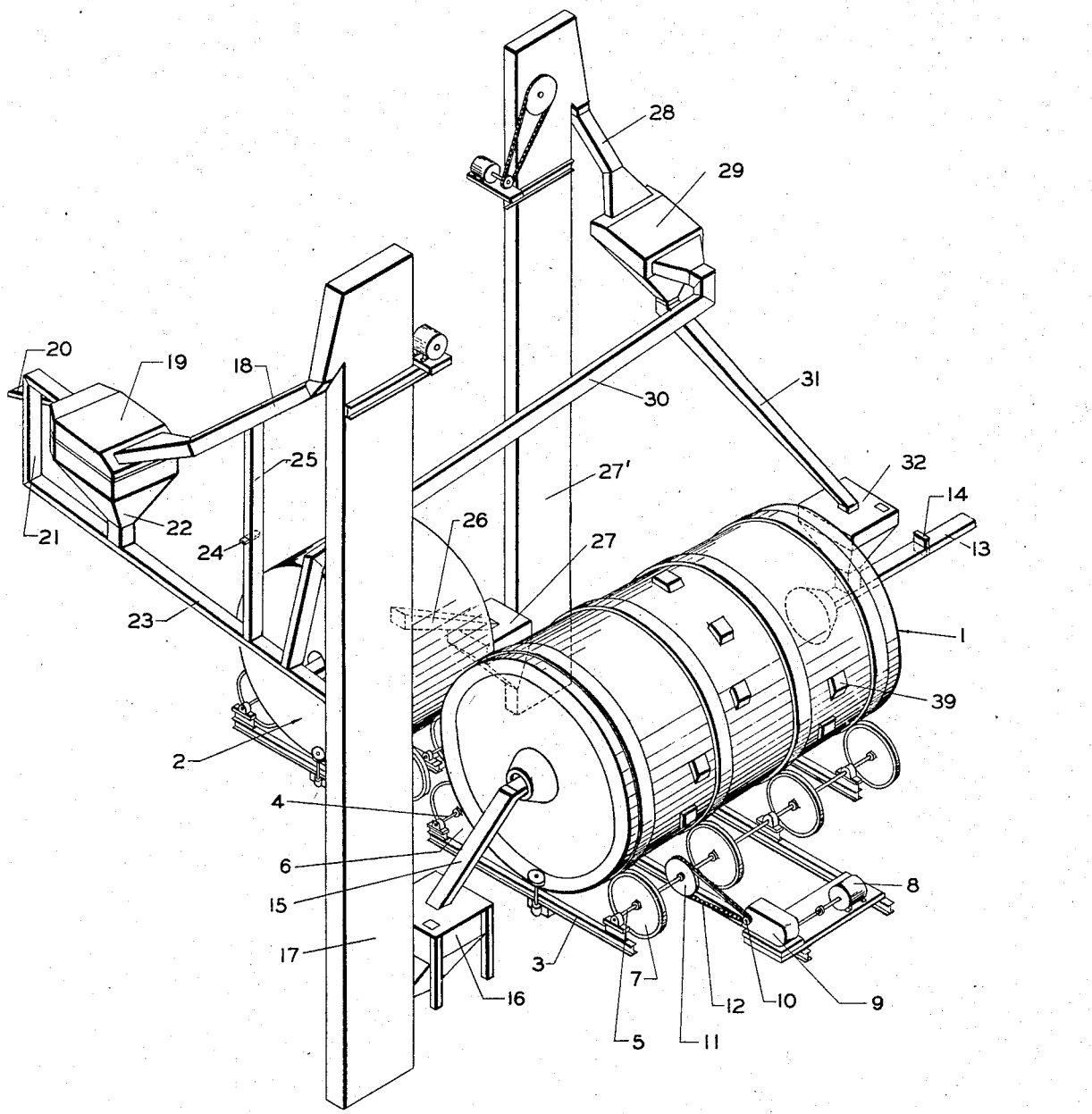
Figure 1 is an isometric view of the entire carbon black agglomerating plant set-up.
Figure 4:
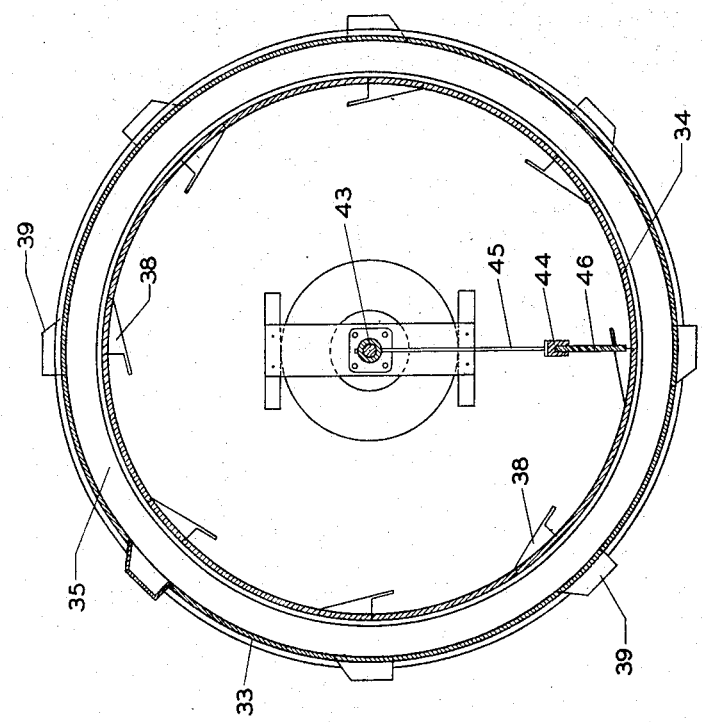
Figure 4 is a cross sectional view of the granulator taken on the line B—B of Figure 2.

In the drawings, wherein for purposes of illustration, is shown an embodiment of the apparatus for carrying forward the process of my invention, I represents the granulator and 2 is the seed mill, both being rotating devices mounted on trunnions of known types and being independently driven by separate motors through reduction gears also of known type. Their speed of rotation may be adjusted by the operator (though this is no part of the invention) and will lie in the range between 4 and 25 R. P. M. Since the rotating mechanism for the granulator 1 and seed mill 2 are identical except for size, only the mechanism for the granulator 1 will be discussed. A supporting member 3 carries a shaft 4 on one end thereof and a shaft 5 on the other end. Mounted on the shafts 4 and 5 to rotate therewith are a series of rollers 6 and 7. The granulator 1 rests on the rollers 6 and 7, and by frictional contact between the rollers and granulator, the granulator is made to rotate when the rollers are actuated by the shaft. A motor 8 and variable speed reducer 9 are mounted on an extension of the support 3 and are connected together. A gear 10 on the varible speed reducer 9 connects with a gear 11 keyed to the shaft 5 by means of the sprocket chain 12 and in this manner rotates the shaft 5 which in turn rotates the rollers 7.

Raw feed, being the carbon black plant product after the conventional treatment for removal of grit, and without any treatment for increase of its density, enters granulator 1 through closed conveyor 13 and a valve 14 in the conveyor 13 controls flow therethrough. The feed end of the granulator 1 is elevated to cause flow of material through it and the agglomerates made within it leave the other end of the mill by the gravity chute 15 which chute delivers the agglomerates to the hopper 16 from whence they go to the bucket elevator 17. Elevator 17 lifts the mixture of aggregates to the top of the elevator 17 where they pass by closed conduit 18 to duplex sifter 19. The sifter 19 separates the material into three fractions; (1) those larger than the size selected as maximum product size, (2) the finished product, and (3) those smaller than the size selected as minimum product size.

Of these, the finished product moves by conveyor pipe 20 to storage. The oversize product leaves the top of the sifter by conveyor pipe 21, the undersize leaves the bottom of the sifter by conduit 22 and both the oversize and undersize flow join in conveyor 23 where they go together through conveyor pipe 23 to the feed entrance of seed mill 2. As manually controlled by the operator, slide valve 24 may, especially on starting, admit to pipe 23 from pipe 18 through conveyor 25 a further supply of the agglomerated carbon black, but before the material has passed through the sifter 19 and if this be used, the material so by-passed also enters the seed mill through the conveyor 23.

In seed mill 2 all material fed to it is subjected to a controlled combination of attrition and agglomeration as will be described under operation and the material after this treatment leaves by chute 26 flowing into hopper 27 where it goes into the base of elevator 27'. From the top of elevator 27', the material flows through conveyor 28 to sifter 29 where it is separated into two fractions. That part which is coarser than the size selected as the maximum seed size flows through conveyor 30 back to conveyor 23 being thus returned to the seed mill 2 for further treatment. The seed size as selected by sifter 29 flows through conveyor 31 into hopper 32 where it is fed into the granulator 1 along with the raw feed coming through line 13.

All conveyors, sifters, elevators, and the mechanical driving mechanism are known commercial devices and are no part of the invention.

Figure 5:
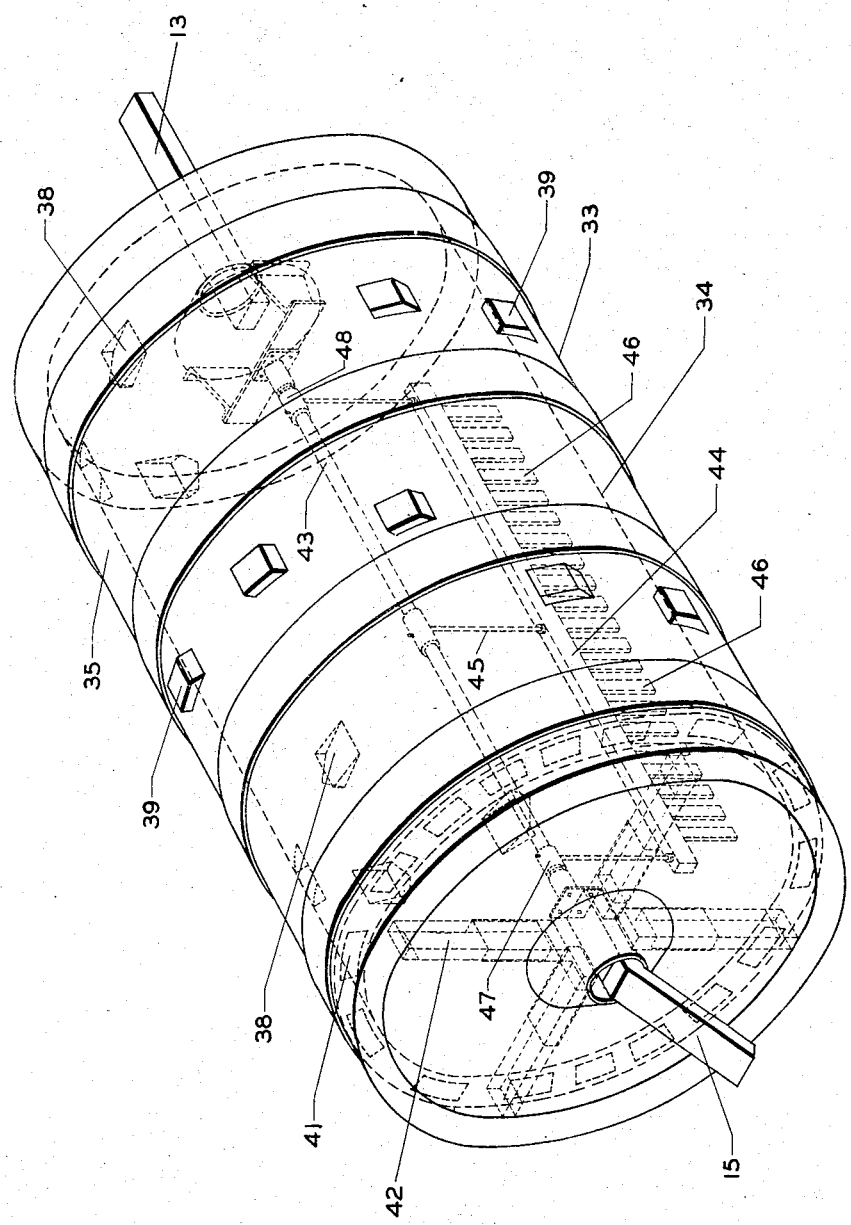
Figure 5 is an isometric view of the granulator.

Having by reference to Figure 1 described the flow sheet, reference is now had to Figures 2–5 for description of the details of the granulator 1 and the seed mill 2 which except for dimensions, are identical, the seed mill having from ¼ to ½ the cubic capacity for material in process of the granulator. In Figure 5 feed line 13 and product line 15 are the lines 13 and 15 of Figure 1 or they may equally represent lines 23 and 26 of the seed mill while the cylindrical body of Figure 5 may equally represent both mills 1 and 2 of Figure 1.

The cylindrical body of mills 1 and 2 comprises two cylinders 33 and 34 and in this use of the mill 1, the external cylinder is about 8 feet in diameter and the internal one about 7 feet in diameter and the description chiefly relates to the annulus 35 between the inner and outer cylinders and to the means of delivering material into this annulus and removing it therefrom.

Material entering by line 13 falls to the inner surface 36 of the inner cylinder. This cylinder by its slope towards the discharge end and by its rotation acts as a conveyor which distributes such material throughout its length until it reaches the longitudinal partition 37 as shown also in Figure 2. This partition 37 marks the end of the inner cylinder and of course of the annulus. Within the inner cylinder 34 are arranged helically, dippers 38 which communicate with and cover openings cut in the inner cylinder. These dippers 38 are also shown in cross section in Figure 2 and are so arranged with reference to the direction of rotation that they dip up the material fed to the machine and deliver it into the annulus.

Figure 2:
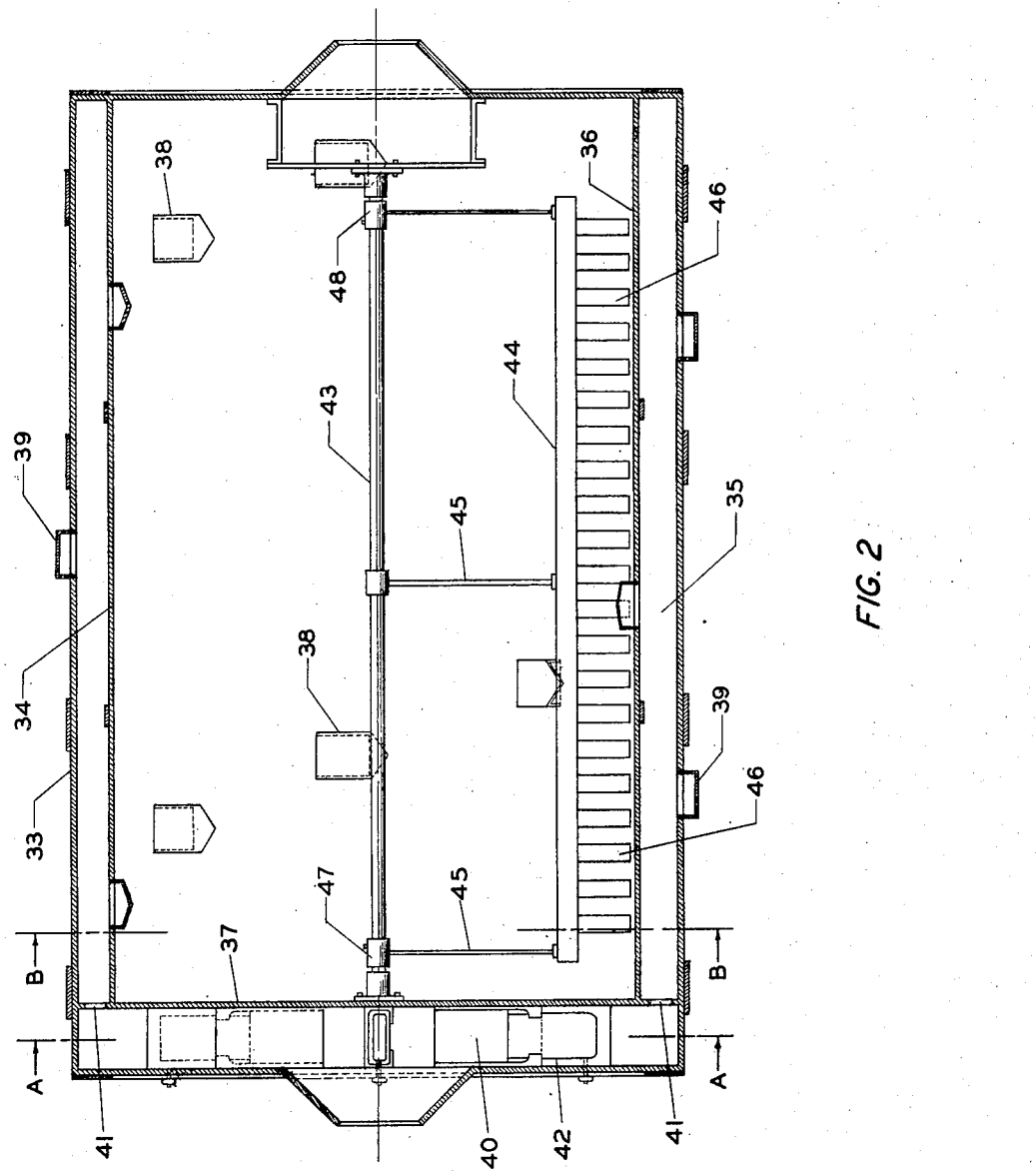
Figure 2 is a longitudinal, vertical sectional view through the center of the granulator taken on the line B—B of Figure 3.

In the outer cylinder are arranged, also in a helical manner, cups 39 which completely cover openings of similar size cut in the wall of that cylinder. These cups 39 are also shown in Figure 2. The existence of dippers 38 and cups 39 is a part of the invention, but their exact size and arrangement are matters of engineering. The dippers 38 should be of such size and number and so arranged as to be substantially oversize for the duty of delivering all material fed to the annulus in a uniform manner. The size and number of cups 39 should be such as to turn over the material in process by moving it from bottom to top position in the annulus in from 10 to 40 revolutions.

Partition 37, marking the length of the inner cylinder, is so located that the outer cylinder is from 5 to 15% longer than the inner one. This provides the non-feeding zone shown at 40 in Figure 2, and in Figure 3 which is the section A—A of Figure 2 which is bounded only by the outer cylinder and its head and by partition 37. This non-feeding section is also provided with cups 39 which continuously move material from the bottom to top position. That annular part of partition 37 which covers the discharge end of the annulus 35 between the inner and outer cylinders 34 and 33 is provided with numerous large slotted openings 41, any one of which is large enough to permit the flow through it of the granules produced in the annulus. Granules flow through such openings 41 as are uncovered into the non-feed zone 40. This non-feed zone 40 of 5 to 15% of the total length, has in principle such a length calculated on the granules maintained within it that granules there rotated will remain long enough for all amorphous material to be absorbed upon them and not so long as to roughen their surface by attrition. This is from about 50 revolutions to about 150.

Figure 3:
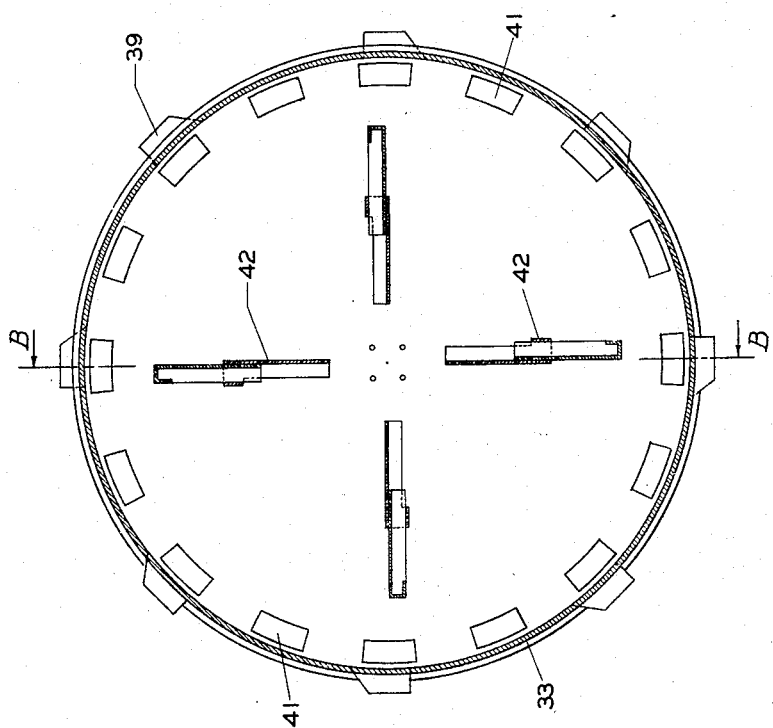
Figure 3 is a cross sectional view of the granulator taken on the line A—A of Figure 2.

The length of residence in the non-feed zone is adjusted by means of the dipping spouts 42 which are shown in Figures 2, 3, and 5. These are open topped spouts with a closed radial end and open central end. They are made in telescoping sections and are adjusted as to length from outside the machine when it is not rotating. They dip into the material in the non-feed zone and as the machine rotates they deliver the granular material into discharge spout 15 located at their common center. Shortening their length will clearly raise the level of material held in the zone and vice versa.

The angle of respose of the granular material is substantially 35 degrees. Material in the non-feed zone will therefore cover such openings 41 as are at the bottom of the rotating cylinder and, depending on the level of material held there, will cover several openings 41 on the ascending half of the annulus. By properly relating the level of material in this non-feed zone with the angle of slope given, the entire machine, time of residence in the non-feed zone and the upper level of granular material held in the delivery end of the annulus are controlled by covering or uncovering more openings 41.

To prevent excessive adherence to the surface 36 of the inner cylinder, which will happen with some kind of carbon black, an internal scraping mechanism is provided. From the stationary internal shaft 43 there is suspended the bar 44 by hangers 45 which are attached to shaft 43 and bar 44. To bar 44 are attached a large number of suitable rubber members 46 designed to have a scratching action on the entire inner surface 36 as it passes beneath them. The weight of the bar 44 with that of members 45 and 46, holds the entire assembly stationary suspended from bearings 47 and 48. In many cases this entire scraping device may be omitted from the "seed mill" 2 and in some cases, especially when a rubber lining or other material to which carbon does not adhere is used in construction, it may be omitted in both cases without affecting the invention.

A description of the operation must start with the vitally necessary charge of high density agglomerated material, for the apparatus as thus far mechanically described, is entirely inoperative for the purpose. Where the processes of the prior art had ingeniously contrived mechanical devices for stirring and governing the motion of the material, in this process, the effective mechanism is the granules of carbon which it itself produces. The cylindrical annulus is but a moving container in which carbon black demonstrates its natural inherent property of agglomeration, its motion being governed by the laws of mathematics.

The initial transition from unconsolidated, amorphous black to the pellets, beads, or granules of commerce is a relatively slow and awkward procedure. Even if one has a supply of the seed of 60 mesh and smaller as used in the prior art, this is of such small size and small unit weight that it is a very slow and quite impractical task to get agglomeration to begin when this is moved or stirred with raw black which has no preliminary densification. So both the Cabot and Huber processes use preliminary densification and Cabot, their "multidirectional" stirring device to impart to such refractory material the necessary rotary motion. In their processes it is necessary in the first time period of Cabot's batch, and the early space locations of Huber's continuous process to pass through this initial transition state. To pass successfully through it is a difficult matter requiring skill derived from experience.

But while the operators of the Cabot and Huber processes pass through this transition stage all the time their processes operate and have learned how to do so with only rare failures, the operation of the present process does not have to pass through it even once. In actual practice, my equipment is charged up to the operating level of each mill with any kind of commercial agglomerated black now on the market, even with the much larger pellets made by a mechanical wet process, the mills are started to rotate and raw feed is introduced. With the riddles in the sifters being of the mesh for the product and seed desired, after a few hours' operation the original charge is replaced with one pertaining to this process. This active charge which is the mechanism of the process, remains in the respective machines, being continuously renewed and replaced by other similar material so that it never wears out during the entire length of operation of the process, though that be years.

It is important to understand the reason for introduction of feed and seed throughout the length of the annulus. Unlike the conventional processes in this and other types of manufacture, the progressive change is not from one end to the other of the apparatus, but is instead from the smaller to the larger sizes of granules which are present with substantial uniformity throughout the active mass. The giving of length to the annulus and limiting its thickness to a reasonable value, possibly 6 inches to 2 feet, is for the purpose of securing uniform distribution of feed over the active surface. This is not only so that all particles may be utilizing the feed supply but also so that presence of the finely divided feed may lubricate the granules and protect them from mutual attrition. It has been learned that at practical operating speed the granulator should have in it at all times about 1,000 times the weight of feed that is added per revolution. This may, alternatively, be defined as from 5% to 10% by weight of the daily production.

One who is unfamiliar with this process usually thinks that granules in the feed end of the annulus which are of product size, will grow too large before reaching the discharge end and it is also thought that such material is wasting space and power because it is not removed when it reaches product size. Besides not being a valid objection, this is the prime virtue of the process and the factor which chiefly constitutes invention, as may be seen from this explanation.

Material in the annulus, of size anywhere in the product range (and the great majority of the material there is in that range) is, for the time being, acting as the mechanism of the process. Instead of having metallic stirring devices which will break, wear out, and cake up with carbon, the product itself is used which, being constantly renewed, cannot wear out, and has no upkeep, and to which it is the purpose that carbon shall cling.

In effect, the first duty of this material is to reproduce itself and it does not get out into the world until it has done so.

In the present machine, the benefit of the sizes on each other is first, the large sizes more readily attain a rotary motion and by frictional contact, they transmit this motion, as in a train of gears, to others. By their greater mass, they smooth out and roll down too thick deposits of feed on all sizes and if, by the law of probability, they are not of greater than average strength, they do not survive to become large. Finally, having survived the competitive conditions, their natural selection is confirmed by the sieve and they are sent out to beget the next generation.

Next the benefit the small ones confer on the large ones is first that they separate the large ones from each other. They shorten the mean free path through which the large ones travel and by their tremendous number of gentle contacts, smooth and compact their otherwise rough exterior. But, most of all, the greater surface of small granules, per unit of weight or per unit of volume, competes with the lesser surface of the larger granules for the definitely limited feed supply. This results in their growth by almost infinitely small increments at points of tangency, each being compacted before another can cover it.

The next advantage which presents itself is in the use of the annulus rather than the cylindrical segment. The angle of repose of the granules approximates 35 degrees. In the rotating cylinder process the moving particles occupy substantially a cylindrical segment, the flat curve of their upper surface approximating a line at the angle of repose from the horizontal and feed is supplied to this body of material only at the inlet end and not throughout its length. Plainly the most vigorous motion of individual particles in this mass is near its thinner edges which is also at the points of least depth of the mass. Even at the center of the segment, the point of greatest depth, the depth of the mass is relatively small being (although this is an operating variable) on the order of 1/8 of the diameter of the cylinder. In the central part of the mass is a relatively quiescent zone where movement of the particles relative to each other is but small.

The moving mass in the annulus of the present process occupies at least 90° of its circumference. Especially at the inlet end, it may occupy nearly 180° so that some material is carried over the top of the annulus. The effective depth of mass is the projection of the curve occupied, which thus ranges from half to the full diameter of the annulus. While it is incorrect to compare the pressure on the material at the bottom of the annulus with that of the head of a similar column of liquid, it has been learned experimentally that there is a very definite advantage in rate of throughput and density of product, when using an annulus of greater circular diameter rather than one smaller, or when holding the mass at a higher level in the same identical annulus. The pressure of compacting on individual granules, is a dynamic rather than a static thing, but is obviously greater near the bottom of the mass. The cups 39 on the external shell continuously move material from this zone of greater pressure to the zone of least pressure at the top. There is thus a succession, many times repeated, of passage from a zone of low pressure through gradually increasing pressure to the zone of maximum pressure as the mass is driven downward through the annulus by material piled on top of it.

The use of the annulus rather than the segment also imparts to the individual granules substantially uniform vigorous motion. This not only results in more efficient utilization of the cubic space provided, but also in smaller power requirement. The granules are not forcibly moved in relatively horizontal planes by the power applied but rather are permitted to fall in relatively vertical planes moved by the force of gravity which is constantly proportional to the mass of each. The power requirement is difficult to define precisely, but it is substantially that required to rotate a cylinder containing an internal friction brake. The power requirement increases with increase of weight of mass contained in the annulus until it reaches a point where material is carried over the top to fall down the empty descending side of the annulus. This shifts the center of gravity towards the center of rotation and reduces power requirement. The carrying of a high level at the inlet end of the granulator is therefore indicated. This is more true of the seed mill, for the unrestrained rolling fall results in some breakage of granules.

Operating characteristics of seed mill

It is a very easy matter to break the granules made by any such process by the conventional methods of spaced rollers or any suitable grinding mill. It is necessary that this be so, in order that the black may readily be dispersed in rubber. It may seem better to use some simple, known device for breaking up as much as necessary, for seed, rather than the much larger device described.

The difficulty which has been overcome in the process is this: If such granules made by the process, or by any of the prior art, be broken down in a conventional grinding device a very large proportion of fines results. This fine material is dense but has a broken and roughened surface. It is the opinion of the inventor which cannot be confirmed because ultimate particles of black are ultra-microscopic, that the surface of good commercial granular black has the material oriented in some way which is not true of the broken particles. This material stacks together like brown sugar, as compared with refined granulated sugar and in a process where it is present, rapidly coats all apparatus it touches. To the extent that it is present in a finished product, it is a source of flying dust fully as bad as the original raw material. It has no slippage planes which may easily move to make it flow and has a tremendous surface area per pound of material.

Raw black which has been given a preliminary densification acquires a very similar character of stickiness to this broken down material and most processes provide scrapers continuously removing it from the walls of the apparatus. If any substantial amount of such material be fed to the present granulator, it first interferes with the uniform introduction of feed and then clogs and impedes the motion of the active moving material. But it has been discovered that if the desired crushing of material to produce seed be done in the presence of an excess amount of free flowing and preferably relatively large granules, all such undesirable fines are at once re-agglomerated on the larger particles with no operating difficulty and with the positive advantage that such re-agglomerated material has density higher than the original. This is true even in the extreme case where 10% to 15% by weight of the material in the seed mill consists of steel balls intentionally introduced. Seed material of substantially higher density and dustless and free flowing even if of size around 100 mesh may thus readily be produced. So in the operating zone of my seed mill, there exists simultaneously a condition of attrition and agglomeration. But the re-agglomeration is less and less effective as the larger receiving particles become smaller, and is most effective when the larger particles are many times the weight of the smaller fines.

In most cases it is unnecessary to add any extraneous grinding balls, and if any be used, it is preferred that they be made, not of steel but of a suitable grade of rubber so that no harm would be done in case any should escape through the two sieves into the product. The use of suitable grinding balls in the seed mill is disclosed, since by this means its size and power consumption may be reduced, it is to be understood this is an engineering and economic option. With the relative size of seed mill which has been described, their use is entirely unnecessary. When none are used, the attrition done there is by the granules of larger than product size acting as balls in a ball mill.

The external elevating cups 39 need special mention for on the seed mill their function is a little different. When no raw feed is present, if it were not for these cups 39, the fines tend to accumulate in the bottom and the larger sizes at the top. The fines thus would have little opportunity to re-agglomerate on the larger sizes. The cups 39 correct this tendency and promote uniformity of both attrition and agglomeration.

Control of results in the seed mill is by changing its speed and by changing the proportion (if any) of grinding balls of extraneous material. There is also another form of control here (not shown on the drawings) by the introduction of a part (up to 20%) of the raw feed to the seed mill, simultaneously introducing the remainder to the granulator. The effect of this is partially to lubricate the contents and to favor re-agglomeration while reducing attrition. The method, too, produces seed of a more rounded appearance. By a proper combination of extraneous balls to increase average density of the mass and of raw feed to reduce their grinding action, maximum capacity for raw feed of the combined mills may be attained and this type of operation is part of the invention.

Though the use of a seed mill in the carbon black agglomerating art is novel, the chief advantage and utility over the prior art resides in the size of seed made in the seed mill. In bare, ideal, theory, it would seem best to use small seed for one pound of 100 mesh seed, if all grown to 28 mesh, would make 64 pounds of that mesh, the seed being 1.65% of the total. One pound of 60 mesh similarly makes only 13.6 pounds of 28 mesh, the seed being 7.35% of the total and a pound of 48 mesh makes 8.7 pounds of 28 mesh, the seed being 11.5% of the total.

Before concluding that small seed are best, one should look further. On the larger end of this scale, a pound of 35 mesh grows to 2.8 pounds of 28 mesh, the seed being 39.4%, and even a pound of 32 mesh grows to 1.685 pounds of 28 mesh, the seed being 59.5% of the total. It is a fact that product should not consist of any single size exclusively and if one produce a range of sizes, for example from 28 down to 100 or even down to 60, it is plain that more seed is required. The subject of what is the best size range for both seed and product is especially important in selecting the best maximum size. Growth of the seed or product almost completely stops at around 14 mesh size. From actual practice and experimentation, it has been found that 28 mesh is a satisfactory maximum size and has been used most but 24 mesh, which is 19% greater in diameter and 70% greater in volume and even 20 mesh, which is 40% greater in diameter and having 2.7 times the volume have both been found to have their advantages. It is to be understood the maximum size of the product can easily be controlled by the size of seed and product of any desired size range can be made depending upon the desires of industry.

The process may be made self seeding as mentioned earlier in the disclosure by merely increasing the length of the non-feed zone 40 in the granulator 1 so that the period of residence of the material there is lengthened enough to cause sufficient attrition to form the necessary seed. Seed so formed is removed in the product sieve 19 and is returned to the feed hopper 32 of the granulator 1, the seed mill 2 being eliminated in this method of operation. This method, while cheaper to construct, is distinctly inferior to the process which incorporates the seed mill therein. Product so made has a roughened surface, the inherent control of seeding is lost and the operator has less positive control over seed production because he cannot independently control the rate of rotation of the seed producing zone.

A closed cycle is one in which material in process repeatedly passes both the point where feed is continuously introduced and the point where product is continuously removed. With reference to processes for the conversion of raw carbon black to granular form, the term "closed cycle" is defined to mean any continuous production cycle in which every part of the apparatus in which granules are produced contains at all times more than 75% by weight of granules larger than 60 mesh in size.

As contrasted with the "batch" process of Cabot and the "once through" or "open cycle" process of Huber, the present invention is a "closed cycle" process. The expression "closed cycle" is used with reference to the agglomerated material which is continuously retained in the apparatus as the effective mechanism. The retention and continuous movement of this material, which has been defined as about 1,000 times the weight of feed added per revolution, is analogous to the retention and continuous movement of the absorption oil in the absorption process for recovery of gasoline from gas, a very well known example of a closed cycle process. Absorption replaced in that industry, the earlier compression process, which was of the "once through" or "open cycle" type.

The weight of agglomerated material moved in unit time past the feed point in the present process is in very large ratio to the material it is to catch and retain, as is the weight of oil circulated, to the weight of components of the gas which it is to catch and retain. As the still and coolers recondition absorption oil for re-use, so the sieve and seed mill maintain the solid granules moving in my closed cycle at uneffective average size. In the oil absorption process the essentials for reconditioning the closed cycle oil are, reduction in its vapor pressure, and in its temperature. In my process the closed cycle material is solid, as compared with the somewhat analogous liquid, and the essentials for its conditioning are the maintenance of a substantially constant and very large active moving surface per pound of material and a substantially constant proportion of granules of product size and larger to govern the motion of granules relative to each other and by their mass as influenced by gravity, the maximum impacts between granules.

Thus the small granules in the large ratio of closed cycle material, chiefly contribute the large active surface for taking up raw material by accretion, while the large ones govern the motion of that surface and the character of the impacts it receives, their own surface and consequently their ability to receive raw material, decreasing relatively as the cube of their diameter increases.

Throughout the specification and claims, where the word granule is employed, it is to be taken to mean a consolidated body of carbon black with density of 20 pounds or greater per cubic foot, a size 100 mesh or larger, though granules of any appreciable size which can be separated by mesh screens without brushing even though that size be smaller than 100 mesh are not to be excluded.

It is to be understood that the form of my invention, herewith shown and described, is to be taken as a preferred example of the same, and that various changes in shape, size, and arrangement of parts may be resorted to in the apparatus without departing from the spirit of the process or the apparatus for carrying forward the process or the scope of the subjoined claims.

I claim:

1. A continuous process for adding flocculent carbon black by accretion to granules already formed in which amorphous feed is introduced into the process in every part of which is continuously retained a mass of previously formed granules of carbon black, 75% by weight of which is larger than 60 mesh, and agglomerating the amorphous black to the granules by subjecting the mixture to motion whereby the particles move by the force of gravity.

2. A continuous process for adding flocculent carbon black by accretion to granules already formed in which the amorphous feed is introduced into the process in every part of which is continuously retained a moving mass of previously formed granules of carbon black, 75% by weight of which is larger than 60 mesh and subjecting the mixture to streamline movement at a rate not greater than 500 feet per minute to agglomerate the amorphous black to the granules.

3. The process of adding flocculent carbon black by accretion to granules already formed which comprises adding a limited quantity of raw undensed carbon black to a stream of previously formed granules of carbon black, agglomerating the raw undensed carbon black to the granules by subjecting the mixture to motion whereby the particles move by force of gravity, removing from the process an equal weight of granules to the raw undensed carbon black added, the material in process repeatedly passing both the point where feed is continuously introduced and the point where product is continuously removed, and wherein the granules in the process at all times greatly exceed the quantity of raw undensed carbon black in the process at any time.

4. The process of adding flocculent carbon black by accretion to granules already formed which comprises adding a limited quantity of raw undensed carbon black to a stream of previously formed granules of carbon black, agglomerating the raw undensed carbon black to the granules by subjecting the mixture to motion whereby the particles move by the force of gravity, removing from the process an equal weight of granules to the raw undensed carbon black added, the material in process repeatedly passing both the point where feed is continuously introduced and the point where product is continuously removed, and wherein at least 75% of the entire carbon black content by weight is at all times composed of granules larger than 60 mesh in size.

5. The process of adding flocculent carbon black by accretion to granules already formed which comprises adding a limited quantity of raw undensed carbon black to a stream of previously formed granules of carbon black, agglomerating the raw undensed carbon black to the granules by subjecting the mixture to motion whereby the particles move by the force of gravity, removing from the process an equal weight of granules to the raw undensed carbon black added, the material in process repeatedly passing both the point where feed is continuously introduced and the point where product is continuously removed, the granules in the process greatly exceeding at all times the quantity of raw undensed black and wherein the granules themselves are the active mechanism to effect agglomeration of the raw carbon black to the granules.

6. The process of adding flocculent carbon black by accretion to granules already formed which comprises adding a limited quantity of raw undensed carbon black to a stream of previously formed granules of carbon black, agglomerating the raw undensed carbon black to the granules by subjecting the mixture to motion whereby the particles move by the force of gravity, removing from the process an equal weight of granules to the raw undensed carbon black added, the material in process repeatedly passing both the point where feed is continuously introduced and the point where product is continuously removed, at least 75% of the entire carbon black content by weight being at all times composed of granules larger than 60 mesh in size and wherein the granules themselves are the active mechanism to effect agglomeration of the raw carbon black to the granules.

7. The process of adding flocculent carbon black by accretion to granules already formed which comprises adding a limited quantity of raw undensed carbon black to a stream of previously formed granules of carbon black, agglomerating the raw undensed carbon black to the granules by subjecting the mixture to motion whereby the particles move by the force of gravity, removing from the process an equal weight of granules to the raw undensed carbon black added, the material in process repeatedly passing both the point where feed is continuously introduced and the point where product is continuously removed, the granules in the process greatly exceeding at all times the quantity of raw undensed carbon black and continuously adding a sufficient supply of granules of small diameter to balance the growth in diameter by accretion from the raw undensed carbon black to maintain the average diameter of the granules retained in the process substantially constant.

8. The process of adding flocculent carbon black by accretion to granules already formed comprising adding a limited quantity of raw undensed carbon black to a stream of previously formed granules of carbon black, agglomerating the raw undensed carbon black to the granules by subjecting the mixture to motion whereby the particles move by force of gravity, removing from the process an equal weight of granules to the raw undensed carbon black added, the material in process repeatedly passing both the point where feed is continuously introduced and the point where product is continuously removed, at least 75% of the entire carbon black content by weight being at all times composed of granules larger than 60 mesh in size and continuously adding a sufficient supply of granules of small diameter to balance the growth in diameter by accretion from the raw undensed carbon black to maintain the average diameter of the granules retained in the process substantially constant.

9. The process of adding flocculent carbon black by accretion to granules already formed which comprises adding a limited quantity of raw undensed carbon black to a stream previously formed granules of carbon black, agglomerating the raw undensed carbon black to the granules by subjecting the mixture to motion whereby the particles move by force of gravity within a confined area and are guided in their fall, removing from the process an equal weight of granules to the raw undensed carbon black added, the material in process repeatedly passing both the point where feed is continuously introduced and the point where product is continuously removed, and wherein the granules in the process at all times greatly exceed the quantity of raw undensed carbon black in the process at any time.

10. The process of adding flocculent carbon black by accretion to granules already formed which comprises adding a limited quantity of raw undensed carbon black to a stream of previously formed granules of carbon black, agglomerating the raw undensed carbon black to the granules by subjecting the mixture to motion whereby the particles move by the force of gravity within a confined area and are guided in their fall, removing from the process an equal weight of granules to the raw undensed carbon black added, the material in process repeatedly passing both the point where feed is continuously introduced and the point where product is continuously removed, and wherein at least 75% of the entire carbon black content by weight is at all times composed of granules larger than 60 mesh in size.

SAMUEL C. CARNEY.